US006630265B1

(12) United States Patent
Taft, III et al.

(10) Patent No.: US 6,630,265 B1
(45) Date of Patent: Oct. 7, 2003

(54) COMPOSITE ELECTROLYTE FOR FUEL CELLS

(75) Inventors: Karl Milton Taft, III, Honolulu, HI (US); Matthew Robert Kurano, Honolulu, HI (US)

(73) Assignee: Hoku Scientific, Inc., Honolulu, HI (US)

( * ) Notice: Subject to any disclaimer, the term of this patent is extended or adjusted under 35 U.S.C. 154(b) by 0 days.

(21) Appl. No.: 10/219,083

(22) Filed: Aug. 13, 2002

(51) Int. Cl.[7] ................................................. H01M 8/10
(52) U.S. Cl. ............................ 429/33; 429/30; 429/34; 429/39; 429/46; 429/249; 429/251; 429/252; 429/253; 429/254; 429/302; 429/303; 204/296; 427/115; 524/445
(58) Field of Search ............................ 204/296; 429/30, 429/33, 34, 39, 46, 302, 303, 249, 251, 252, 253, 254; 524/445; 427/115

(56) References Cited

U.S. PATENT DOCUMENTS

| | | | |
|---|---|---|---|
| 4,330,654 A | | 5/1982 | Ezzell et al. |
| 5,248,566 A | | 9/1993 | Kumar et al. |
| 5,272,017 A | | 12/1993 | Swathirajan et al. |
| 5,547,551 A | | 8/1996 | Bahar et al. |
| 5,547,777 A | | 8/1996 | Richards |
| 5,599,614 A | | 2/1997 | Bahar et al. |
| 5,635,041 A | | 6/1997 | Bahar et al. |
| 5,716,727 A | | 2/1998 | Savinell et al. |
| 5,766,787 A | | 6/1998 | Watanabe et al. |
| 5,942,347 A | | 8/1999 | Koncar et al. |
| 5,958,354 A | | 9/1999 | Thompson et al. |
| 6,042,958 A | | 3/2000 | Denton et al. |
| 6,045,935 A | | 4/2000 | Ketcham et al. |
| 6,059,943 A | * | 5/2000 | Murphy et al. .............. 204/296 |
| 6,096,449 A | | 8/2000 | Fuglevand et al. |
| 6,099,988 A | | 8/2000 | Savinell et al. |
| 6,242,135 B1 | * | 6/2001 | Mushiake ..................... 429/33 |
| 6,248,469 B1 | * | 6/2001 | Formato et al. .............. 429/46 |
| 6,387,230 B1 | | 5/2002 | Murphy et al. |
| 6,387,556 B1 | | 5/2002 | Fuglevand et al. |
| 6,521,690 B1 | * | 2/2003 | Ross et al. ................... 524/445 |
| 6,527,955 B1 | * | 3/2003 | Sun ............................. 429/252 |

OTHER PUBLICATIONS

P. Aranda, et al., "Poly(ethylene oxide)/$NH_4^+$–Smectitie Nanocomposites", Applied Clay Science, 15, (Mar. 1999), 119–135.

H.W. Chen, et al., "The Novel Polymer Electrolyte Nanocomposite Composed of Poly(ethylene oxide), Lithium Triflate and Mineral Clay", Polymer, 42, Jul. 2001, 9763–9769.

P. Staiti et al., Hybrid Nafion–silica Membranes Doped with Heteropolyacids for Application in Direct Methanol Fuel Cells, Solid State Ionics, 145, Jan. 2001, 101–107.

B. Tazi, et al., "Parameters of PEM Fuel Cells Based on New Membranes Fabricated Form Nafion, Silicotungstic Acid and Thiophene", Electrochimica Acta, 45, Mar. 2000, 4329–4339.

K.T. Adjemian et al., "Silicon Oxide Nafion Composite Membranes for Proton–Exchange Membrane Fuel Cell Operation at 80–140° C.", Journal of the Electrochemical Society, 149 (3), Oct. 2001, A256–A261.

P. Costamagna et al., "Nafion 115/Ziurconium Phosphate Composite Membranes for Operation of PEMFCs Above 100° C.", Electrochimica Acta, 47, Jan. 2002, 1023–1033.

D.H. Jung, "A Performance Evaluation of Direct Methanol Fuel Cell Using Impregnated Tetraethyl–orthosilicate in Cross–linked Polymer Membrane", International Journal of Hydrogen Energy, 26, Dec. 2001, 1263–1269.

B. Liao et al., "Polymer–layered Silicate Nanocomposites. 1. A Study of Poly(ethylene oxide)/$Na^+$–Montmorillonite Nanocomposites as Polyelectrolytes and Polyethylene–block–poly(ethylene glycol) Copolymer/$Na^{30}$ –Montmorillonite Nanocomposites as fillers for Reinforcement of Polyethylene", Polymer, 42, Jul. 2001, 10007–10011.

N. Miyake et al., "Evaluation of a sol–gel derived Nafion/Silica Hybrid Membrane for Polymer Electrolyte Membrane Fuel Cell Applications", Journal of the Electrochemical Society, 148 (8), Jul. 2001, A905–A909.

Y. Park et al., "Proton Exchange Nanocomposite Membranes Based on 3–Glycidoxypropyltrimethoxysilane, Silicotungstic Acid and α–Zirconium Phosphate Hydrate", Solid State Ionics, 145, Jan. 2001, 149–160.

E. Ruiz–Hitzky et al., "Proton Conductivity in Al–montmorillonite pillared Clays", Solid State Ionics, 85, May 1996, 313–317.

P. Staiti, "Proton Conductive Membranes Based on Silicotungstic Acid/Silica and Polybenzimidazole", Materials Letters, 47, Feb. 2001, 241–246.

A. Szucs et al., "Preparation and Hydrogen Sorption of Pd Nanoparticles on $Al_2O_3$ Pillared Clays", Colloids and Surfaces A: Physicochemical and Engineering Aspects 139, Jul. 1998, 109–118.

K.J. Yao et al., "Polymer/layered Clay Nanocomposites: 2 Polyurethane Nanocomposites", Polymer, 43, Sep. 2001, 1017–1020.

P. Costamagna, et al., "Quantum jumps in the PEMFC science and technology from the 1960s to the year 2000 Part I. Fundamental scientific aspects", Journal of Power Sources 102, Apr. 2001, 242–252.

P. Costamagna, et al., "Quantum jumps in the PEMFC science and technology from the 1960s to the year 2000 Part II. Engineering, technology development and application aspects", Journal of Power Sources 102, Apr. 2001, 253–269.

* cited by examiner

*Primary Examiner*—Bruce F. Bell
(74) *Attorney, Agent, or Firm*—Rambod Nader; Harmohinder Bedi; Dechert LLP

(57) ABSTRACT

An inexpensive composite electrolyte for use in electrochemical fuel cells includes (i) an inorganic cation exchange material, (i) a silica-based binder; and (ii) a polymer-based binder. The cation exchange material includes aluminosilicate clays. The composite electrolyte can be fabricated with a tape casting apparatus.

33 Claims, 3 Drawing Sheets

COMPOSITE ELECTROLYTE FOR FUEL CELLS

COMPOSITE ELECTROLYTE FOR FUEL CELLS

This invention was made with Government support under Contract No. 0128641 awarded by the National Science Foundation to Hoku Scientific, Inc. The Government may have certain rights to the invention.

FIELD OF THE INVENTION

The present invention relates to composite membranes that include an inorganic cation exchange material, a polymer-based binder, and a silica-based binder. The composite membranes are suitable for use in electrochemical applications, particularly as membrane electrolytes in electrochemical fuel cells.

BACKGROUND OF THE INVENTION

There is considerable demand for a high power density power source that is efficient, reliable, quiet, lightweight and environmentally friendly. Fuel cells, which are highly efficient electrochemical energy production devices, offer one potential solution. They convert chemical energy from renewable fuels directly into electrical energy.

Although the outlook for fuel cells is very promising, they have yet to achieve broad market penetration. The primary reason is that fuel cells require expensive materials and processes to manufacture. Proton exchange membrane (PEM) or solid polymer electrolyte (SPE) fuel cells currently represent one of the leading fuel cell technologies. PEM fuel cells have the highest power density of all the fuel cell designs. With suitable uses in the portable, stationary, and transportation markets, PEM fuel cells also offer broad market application. In addition, PEM fuel cells are extremely efficient (~50%), do not produce noise, and are relatively simple to manufacture.

PEM fuel cells typically employ an ion conducting electrolyte membrane between a positive electrode (cathode) and a negative electrode (anode), with each electrode containing a metal catalyst supported by a conductive material. Some PEM fuel cells use a diffusion layer on both electrodes to help distribute gases evenly across the electrode surfaces. Reactions take place where the electrolyte, gas, and electrode are in contact with one another.

The ion conducting membrane material plays a critical role in the operations of PEM fuel cells. It has three primary functions: (1) as an ion conductor between anode and cathode; (2) as a separator for the fuel and oxidant; and (3) as an insulator between the cathode and anode so that electrons conduct though an electronic circuit and not directly through the membrane.

During fuel cell operation, a fuel such as hydrogen is distributed evenly over the anode electrode. Hydrogen reacts with the catalyst to produce protons and electrons. The protons are transferred through the surface of the electrolyte to the cathode, while the electrons are conducted via an electrically conductive material through an external circuit to the anode. At the cathode, an oxidant such as oxygen permeates through the electrode where it combines with the electrons and protons to form water. The operation of PEM fuel cells produces three major byproducts: water, heat and electricity. The extent to which proton and electron resistance can be reduced in a PEM fuel cell, is a major factor in determining the future efficiency of this fuel cell design.

Several polymer electrolyte membranes have become the primary options for use as proton exchange membranes in PEM fuel cells. Unfortunately, these membranes have substantial cost and performance limitations that have hindered the commercialization of PEM fuel cells. Specifically, current PEM fuel cell membranes are very expensive to produce, and exhibit inadequate ionic conductivity, dehydration resistance, dimensional stability, and fuel crossover resistance.

Temperature tolerance is a fundamental requirement for a PEM fuel cell membrane. To make PEM fuel cells commercially viable, the membrane must be able to support operations at elevated temperatures. At these temperatures, power density is increased and sensitivity to fuel and oxidant impurities is reduced. High temperature operation also allows for cogeneration capabilities in fuel cell systems, which would broaden market appeal for these systems. High temperature operation is difficult to maintain using current ion exchange membranes, as they are prone to dehydration at elevated temperatures.

DuPont has developed a perfluoronated membrane under the trade name NAFION for use in fuel cells and other related applications. NAFION and its derivatives are the most commonly used ion exchange membranes in PEM fuel cells. NAFION, which is described, for example, in U.S. Pat. No. 4,330,654 is fabricated by melting tetrafuoroethylene and perfluorovinyl ethersulfonyl fluoride together, shaping the mixture, and then hydrolyzing the melt to yield the ionic sulfonate form.

While NAFION is an effective membrane within the context of PEM fuel cells, the polymer has a variety of limitations that have hampered the emergence of the PEM fuel cell design. NAFION conducts protons with the aid of water, but if the membrane is not properly hydrated, proton conduction slows. NAFION is also very susceptible to osmotic swelling.

There is a significant size difference between NAFION that is 0% hydrated and NAFION that is 100% hydrated, and this feature is a determinative factor in the longevity and performance of a PEM fuel cell. This osmotic swelling is of particular note in the cycle times of PEM fuel cells that use NAFION. If these fuel cells require many cycle times for operation, they will deteriorate faster than if they are continually in operation. This is primarily due to the swelling and shrinking of NAFION during PEM fuel cell cycles. As a corollary, the original state of the fuel cell is also altered mechanically during these cycles, thereby lowering PEM fuel cell performance over time.

The osmotic expansion of NAFION also reduces the consistency of the membrane electrode assembly (MEA) during production. In PEM fuel cells, catalyst is typically deposited directly onto the surface of NAFION using one of several techniques. The amount of deposited catalyst is critical to optimizing the cell design. Because of NAFION's high osmotic expansion, the density of the catalyst may be affected at higher humidity levels.

NAFION also has inconsistent structures which, if not detected and removed, will limit fuel cell efficiency. These inconsistencies, which are referred to as chunks, result from the presence of inhomogeneous polymers. Chunks have lower proton conductivities which can adversely impact MEA and stack assembly.

High cost is another of NAFION's major drawbacks. Due to its relatively complicated and time-consuming manufacturing process, NAFION is very expensive. A square meter of NAFION costs approximately $500. At this rate, the cost of NAFION represents a significant portion of the overall cost of a PEM fuel cell. Indeed, it may represent from 10 to 15% of the total cost of a single fuel cell or stack of fuel cells. It is generally accepted that if NAFION continues to represent the leading membrane candidate for PEM fuel cells, its cost must be reduced substantially before they can emerge as a competitive commercial alternative to existing power generators.

NAFION is also limited to operating temperatures below 100° C. Among other things, high temperatures cause low proton conductivity, dehydration and degradation. Much research has focused on using sol-gel and other processes to infiltrate the porous structure of NAFION with components that will increase its performance at elevated temperatures. Staiti et. al. and Tazi et. al. impregnated NAFION with phosphotungstic acid and silicotungstic acid/thiophene, respectively, which increased proton conductivity and hydration levels at temperatures approaching 120° C. See, P. Staiti, "Proton Conductive Membranes Based on Silicotungstic Acid/Silica and Polybenzimidazole", *Materials Letters*, 47, 2001, 241–246, and B. Tazi et al., "Parameters of PEM Fuel Cells Based on New Membranes Fabricated From Nafion, Silicotungstic Acid and Thiophene", *Electrochimica Acta*, 45, 2000, 4329–4339. Others including P. Costamagna et al. and Park et al. demonstrated that NAFION doped with zirconium hydrogen phosphate provided similar results as well. See, P. Costamagna et al., "Nafion 115/Zirconium Phosphate Composite Membranes for Operation of PEM-FCs Above 100° C., *Electrochimica Acta*, 47, 2002, 1023–1033 and Y. Park et al., "Proton Exchange Nanocomposite Membranes Based on 3-Glycidoxypropyltrimethoxysilane, Silicotungstic Acid and α-Zirconium Phosphate Hydrate", *Solid State Ionics*, 145, 2001, 149–160. However, by using NAFION as the base material, these membranes are still very expensive. In addition, these additives tend to leach out of the membrane structure during fuel cell operations, which limits their utility.

Developers are working on a variety of alternative membranes to resolve the technical limitations facing NAFION in PEM fuel cells, but none of these alternatives has demonstrated sufficient advantages to replace NAFION as the membrane of choice. One alternative membrane incorporates NAFION or a NAFION-like polymer into a porous polytetrafluoroethylene (TEFLON) structure. These membranes are available under the trade name GORE-SELECT from W. L. Gore & Associates, Inc. and they are described in U.S. Pat. Nos. 5,635,041, 5,547,551 and 5,599,614. Other alternative membranes are available under the trade names ACIPLEX from Asahi Chemical Co. and FLEMION from Asahi Glass. Due to their polyfluorinated structures, these alternative membranes exhibit many of the same deficiencies as NAFION, namely, inadequacies with respect to ionic conductivity, dehydration resistance, dimensional stability and fuel crossover.

Composite ion exchange membranes containing a low expansion, durable polymer impregnated with a high proton conductive polymer described, for example, in U.S. Pat. No. 6,248,469, represent another alternative. The main disadvantage of these membranes is that they loose the cross sectional area of the high proton conductive material due to the presence of the durable polymer support.

A further alternative membrane employs polybenzimidazole polymers (PBI) that are infiltrated with phosphoric acid. These have been used as ion exchange membranes in PEM fuel cell,s and are described in U.S. Pat. Nos. 5,716,727 and 6,099,988. These membranes permit PEM fuel cells to operate at higher temperatures of about 130° C., and exhibit lower osmotic expansion than that of NAFION. However, the concentrated acid in the PBI pores leaches out as water is produced from the electrochemical fuel cell process, thereby dramatically reducing membrane and electrochemical cell performance. The leached phosphoric acid may also react poorly with other components in the fuel cell stack.

Finally, more recent research has led to unique formulations and designs of ion exchange membranes. For example, Chen et. al. showed that incorporating montmorillonite and lithium triflate into poly(ethyl oxide) (PEO) produced a membrane that exhibited fuel cell output that was nearly sixteen times higher than in fuel cells using PEO by itself. See Chen et al., "The Novel Polymer Electrolyte Nanocomposite Composed of Poly(ethylene oxide), Lithium Triflate and Mineral Clay", *Polymer*, 42, 2001, 9763–9769. However, the increased proton conductivity values in these fuel cells were still substantially lower than that produced by fuel cells using NAFION. Similarly, Aranda et. al. created a membrane by combining poly(ethylene oxide) and ammonium exchanged montmorillonite, but the membrane also exhibited low ion conductivity.

As is apparent, there is a need for an inexpensive and higher performing proton exchange membrane for use in PEM and other low operation temperature fuel cells, and for one or more methods of membrane fabrication that are more cost effective than those used to produce NAFION.

SUMMARY OF THE INVENTION

The present invention is based, in part, on the discovery of composite electrolyte membranes that can be used as proton exchange membranes in PEM fuel cells, and the processes for producing these membranes.

One aspect of the invention is directed to a composite electrolyte for use in electrochemical fuel cells that includes:
(i) an inorganic cation exchange material;
(ii) a silica-based binder; and
(iii) a polymer-based binder.

Preferred cation exchange materials include, for example, clays, zeolites, hydrous oxides, and inorganic salts.

In another aspect, the invention is directed to in an electrochemical fuel cell that includes:
(i) an anode;
(ii) a cathode;
(iii) fuel supply means for supplying fuel toward the anode;
(iv) oxidant supply means for supplying an oxidant toward the cathode; and
(v) a composite electrolyte as defined above that is positioned between the anode and cathode.

In a further aspect, the invention is directed towards a method of fabricating a composite membrane suitable for use in an electrochemical fuel cell that includes the steps of:
(i) applying a viscous liquid composition comprised of (a) an inorganic cation exchange material, (b) a silica-based binder, (c) a polymer-based binder, and (d) a solvent onto a surface of a substrate;
(ii) spreading the viscous liquid composition to form a uniform thickness layer on the substrate; and
(iii) allowing the solvent to evaporate from the viscous liquid composition to yield the composite electrolyte.

DESCRIPTION OF PREFERRED EMBODIMENTS

Figure 1:
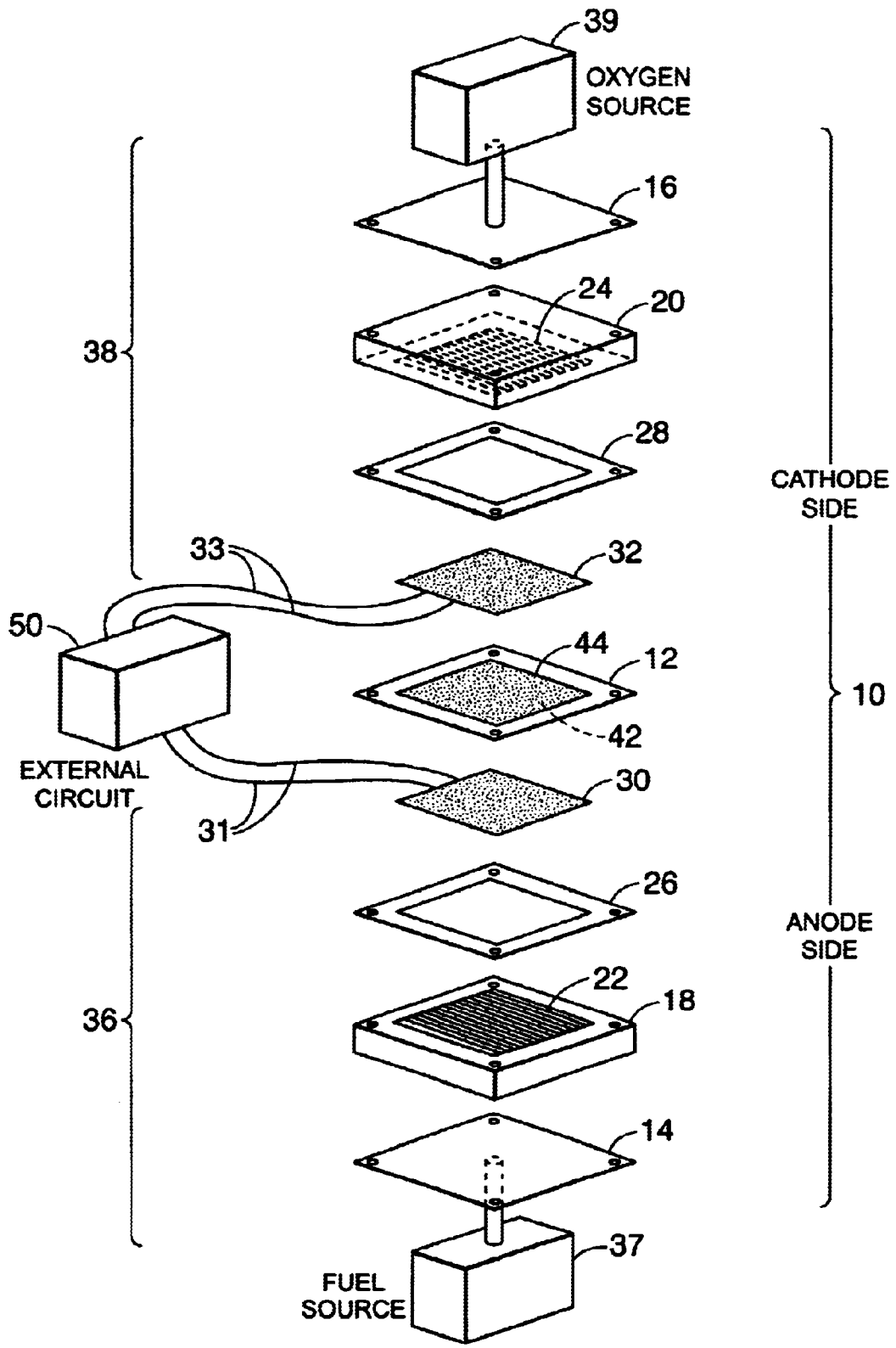
FIG. 1 illustrates a disassembled fuel cell.

The present invention provides a low cost, composite membrane with comparable power densities to NAFION and other solid polymer electrolytes. Among other things, the composite membrane is expected to alleviate the water management problems associated with current electrolyte membranes.

In general, the composite electrolyte comprises: (i) an inorganic cation exchange material, (ii) a silica-based binder, and (iii) a polymer-based binder. Preferred inorganic cation exchange materials include clays, zeolites, hydrous oxides, and:inorganic salts, which are described, for example, in Amphlett, C. B., *Inorganic Ion Exchangers*, Elsevier Publishing Co., Amsterdam, 1964, and Qureshi et al., *Inorganic Ion Exchangers in Chemical Analysis*, CRC Press, Boca Raton, 2000. Preferred zeolites include heulandite, analcite, chabazite, phillipsite, ZK5, ZK4, mordenite, and the linde family. Preferred hydrous oxides include ferrous hydroxide, magnesium hydroxide, aluminum hydroxide, and beryllium oxide. Preferred inorganic salts include zirconium phosphate, titanium phosphate, zirconium arsenate, tin phosphate, and cerium phosphate. Preferred clays include aluminosilicate-based exchange materials selected from the group consisting of montmorillonite, kaolinite, vermiculite, smectite, hectorite, mica, bentonite, nontronite, beidellite, volkonskoite, saponite, magadite, kenyaite, zeolite, alumina, rutile, and mixtures thereof. These clays are commercially available. For example, kaolin and montmorillonite are both available from Aldrich Fine Chemicals. Typically, the composite electrolyte is comprised of about 10% to about 99% inorganic cation exchange material, and preferably about 75% to about 85% (all percentages herein are based on weight unless otherwise noted). The size of the inorganic exchange material typically ranges from about 0.005 $\mu$m to about 5 $\mu$m, and preferably from about 0.5 $\mu$m to about 1 $\mu$m.

The inorganic cation exchange materials serve a number of functions. Foremost, these materials facilitate the transfer of protons through the composite electrolyte membrane. It has been demonstrated that aluminosilicates, such as montmorillonite or kaolinite, when mixed with a non-conductive polymer, form a membrane that exhibits proton conductivity. Secondly, the inorganic cation exchange materials afford structural integrity to the composite electrolyte membrane, in particular, these materials help stabilize the membrane so as to reduce the degree of dimensional fluctuations caused by electrochemical cell temperature variations and/or variations in composite electrolyte membrane water content.

The silica-based binder is comprised of materials containing silica, silicates, and/or silicates having organic groups such as silicate esters. The silica-based binder increases the ion exchange capacity of the inorganic cation exchange material especially certain clays, such as kaolinite. The addition of a silica-based binder to kaolinite increases kaolinite's cation exchange capacity by 200% in some cases. As a corollary, the proton conductivity of the composite electrolyte membrane is improved. Preferred silica-based binders include a colloidal silica comprising discrete spheres of silica that is available under the trade name LUDOX from Aldrich Fine Chemicals. Another preferred silica-based binder is tetraethylorthosilicate (TEOS) also from Aldrich Fine Chemicals. Typically, the composite electrolyte contains about 0.5% to about 40% and preferably from about 2.5% to about 7.5% of the silica-based binder. The size of the silica typically ranges from about 0.005 $\mu$m to about 10 $\mu$m and preferably from about 0.2 $\mu$m to about 5 $\mu$m.

The polymer-based binder is comprised of a polymer material that serves as the adhesive for the other components of the composite electrolyte. Any suitable polymer that is sufficiently chemically inert, mechanically durable, and ductile to withstand the operation conditions of electrochemical devices, particularly those of PEM fuel cells, can be employed. Preferred polymer-based binders include acrylonitrile/butadiene/stryene rubber (ABS), styrene butadiene/acrylate/acetate polymer blends, epoxides, and thermoplastics. Preferred thermoplastics include polypropylene, polycarbonate, polystyrene, polyethylene, and polysulfone. Particularly, preferred polymers have functional groups such as, sulfate, phosphate, or carbonate groups, that have inherent proton conducting capabilities. Thus, the polymer-based binder, besides increasing the mechanical strength of the composite electrolyte membrane, also increases the proton conductivity during electrochemical cell operation. Typically, the composite electrolyte is comprised of about 1.0% to about 90% and preferably from about 15% to about 40% polymer-based binder.

The composite electrolyte can further include additives such as preservatives, thixotropy and viscosity control agents, plasticizers, water control agents, proton conducting materials and other enhancing components commonly known in the art. However, the dried composite electrolyte membrane consists essentially of three primary components, namely: (i) an inorganic cation exchange material, (ii) a silica-based binder, and (iii) a polymer-based binder. Indeed, in preferred embodiments, the three primary components make up at least 97% and typically 98% or more of the solids of the composite electrolyte. In particular, the composite electrolyte does not require perfluoronated polymers such as NAFION or its derivatives. In addition, other traditional membrane materials such as polypropylene and acidified polystyrene are also not required. The composite electrolyte membrane is expected to support fuel cell operations typically between 90° C. to 120° C. When used in a fuel cell, the composite electrolyte membrane typically will have a thickness ranging from about 10 $\mu$m to about 200 $\mu$m and preferably from about 45 $\mu$m to about 100 $\mu$m.

The composite electrolyte preferably has a proton conductivity on the order of 0.005 S/cm and more preferably of at least 0.05 S/cm. This will enable the rapid proton transfer from anode to cathode when the composite electrolyte is used as a proton exchange membrane in a fuel cell. In addition, the membrane must be physically robust enough to withstand MEA manufacturing processes and pressure differentials within a fuel cell stack. Furthermore, the membrane should have a high water retaining potential. This will enable higher temperature operation without sacrificing proton conductivity. Finally, the membrane should be chemically robust so as not to degrade in the stack environment.

Figure 2:
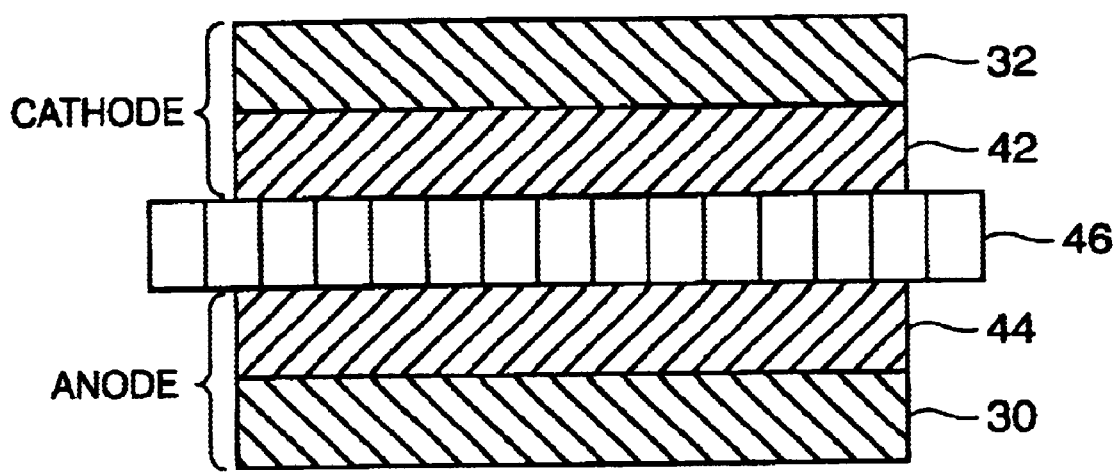
FIG. 2 illustrates a partial cross sectional view of a single electrochemical fuel cell
Figure 3:
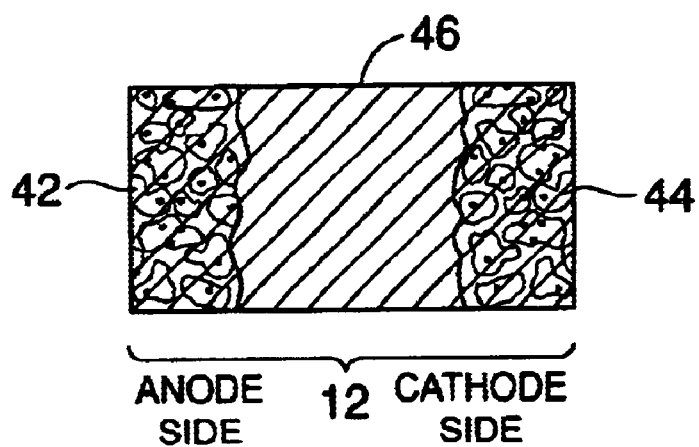
FIG. 3 illustrates a partial cross sectional view of a membrane electrode assembly.

The composite electrolyte of the present invention is particularly suited for use as the proton exchange membrane in an electrochemical fuel cell that is illustrated in FIGS. 1, 2, and 3. The electrochemical cell 10 generally includes a membrane electrode assembly 12 flanked by the anode and cathode structures. On the anode side, the cell includes an endplate 14, graphite block or bipolar plate 18 with openings 22 to facilitate gas distribution, gasket 26, and anode carbon cloth current collector 30. Conversely, on the cathode side, the cell includes stainless steel endplate 16, graphite block or bipolar plate 20 with openings 24 to facilitate gas distribution, gasket 28, and cathode carbon cloth current collector 32. The carbon cloth material is a porous conductive substance.

The electrochemical cell also includes a membrane electrode assembly (MEA) 12 as shown in FIG. 1 and 3. The MEA includes a proton exchange membrane 46 that is flanked by anode 42 and cathode 44. Each electrode is made of a porous electrode material such as carbon cloth or carbon paper. The proton exchange membrane 46, which comprises the inventive composite electrolyte, provides for ion transport during operation of the fuel cell. Anode current collector 30 and cathode current collector 32 are connected to external circuit 50 by leads 31, 33 respectively. The external circuit can comprise any conventional electronic device or load such as those described in U.S. Pat. Nos. 5,248,566, 5,272,017, 5,547,777, and 6,387,556, which are incorporated herein by reference. The components can be hermetically sealed by known techniques.

In operation, fuel from fuel source 37 diffuses through the anode and an oxidizer from oxidizer source 39 (e.g., container or ampule) diffuses to the cathode of the MEA. The chemical reactions at the MEA generate electricity that is transported to the external circuit. Hydrogen fuel cells use hydrogen as the fuel and oxygen as the oxidizer. For direct methanol fuel cells, the fuel is liquid methanol.

The inventive composite electrolyte can be employed in conventional fuel cells which are described, for example, in U.S. Pat. No. 5,248,566 and 5,547,777. In addition, several fuel cells can be connected in series by conventional means to create fuel cell stacks.

METHODOLOGY

The composite membranes of the present invention can be fabricated by thoroughly mixing the membrane components in a solvent to minimize agglomeration. Water is the preferred solvent; raising the pH of the water on occasion helps to stabilize the particles in the slurry and facilitate mixing. The viscous slurry is poured over a substrate and leveled to a uniform thickness. After evaporation of the solvent and removal from the substrate, the membrane is cut to size and is ready for use. Heat can be applied to facilitate evaporation. A preferred technique is a tape casting method whereby the slurry of components is poured onto a silicon coated polyester (MYLAR) sheet. A doctor blade moving across the slurry adjusts the height to the desired thickness ranging from about 0.5 $\mu$m to about 500 $\mu$m and preferably from about 100 $\mu$m to about 300 $\mu$m. Evaporation of the solvent takes place in a controlled temperature and humidity environment.

EXPERIMENTAL

The following examples, illustrate a number of the composite membrane electrolytes that were formulated and tested.

EXAMPLE 1

Figure 5:
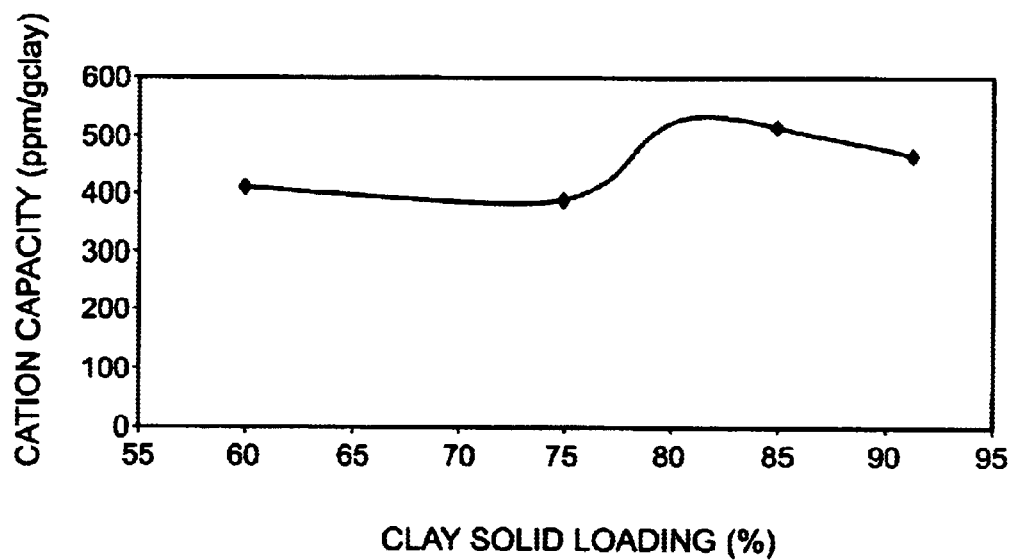
FIG. 5 is a graph of cation exchange capacity vs. clay solid content of composite electrolyte membrane.

A composite electrolyte containing aluminosilicate clay as the inorganic cation exchange material was fabricated as follows: 8 grams of aluminosilicate clay material (Kaolin from Aldrich) were quantified and desiccated at 23° C. 1 gram of LUDOX HS-40 colloidal silica solution (Aldrich Fine Chemicals) was combined with 3 grams of LATEX 460 NA (Dow Chemicals) and the mixture was thoroughly homogenized through mechanical agitation for 5 minutes at 23° C. 1 gram increments of the desiccated aluminosilicate material were added to the binder solution as the binder solution was agitated. Either 1M NaOH or deionized $H_2O$ was added in 1.5 mL aliquots to retain the liquid phase of the clay/binder solution while mixing. Aliquots were added only to keep the consistency of the slurry similar to that of a light paste. Once all the kaolinite was added to the binder solution and the proper consistency obtained, the slurry was transferred onto silicon coated MYLAR sheets and leveled to the objective thickness with a doctor blade (0.2–0.5 mm thick wet). The leveled membrane was allowed to dry for 5 hours at 23° C. and 40% RH, until polymer cross linking was completed formulation. FIG. 5 shows the change in CEC at 5 different clay levels, as is apparent, the highest CEC was observed at approximately 80% clay. and the membrane was ready for removal. The dried membrane was peeled from the MYLAR sheet and trimmed to the desired size for membrane electrode assembly construction. These membranes were incorporated into an MEA and run in a single electrochemical cell, that was similar to that described in U.S. Pat. No. 5,272,017. Initial testing yielded 5 mA/cm$^2$ at ambient temperatures for hydrogen and air. The cation exchange capacity was 0.35 meq/g. Qualitatively, the membrane was flexible and shear force resistant.

EXAMPLE 2

Another composite electrolyte using the procedure of Example 1 was fabricated except that 8 grams of montmorillonite (instead of kaolinite) was combined with LUDOX and LATEX. Power density of the membranes was found to be approximately the same as those in Example 1. Cation exchange capacity was 0.5 meq/g. These membranes physically were harder to lay out than the one in Example 1. It is believed the montmorillonite was causing the latex to agglomerate prematurely.

EXAMPLE 3

Another composite electrolyte using the procedure of Example 1 was fabricated except that 8 grams of kaolinite was combined with 0.5 grams of TEOS and 3.5 grams of LATEX. The cation exchange capacity for these membranes was 0.45 meq/g.

Modifications of Examples 1–3

The physical properties of the composite electrolyte membrane in Examples 1–3 can be adjusted by altering the constituents of the membrane and/or by varying their relative amounts. For instance, increasing in the percentage of colloidal silica (LUDOX) yields a membrane with a higher membrane cation exchange capacity but lower tensile strength. Conversely, increasing the percentage of the polymer-based binder (e.g., latex) increases mechanical strength but lowers the overall cation exchange capacity of the membrane. Finally, clay solid loading of approximately 80% yields a maximized cation exchange capacity (CEC) with the binder

Electrochemical Testing of Example 1

Electrochemical cell tests were done for the membrane fabricated in Example 1 and for NAFION membranes. Completed membranes were prepared in membrane electrode assemblies (MEAs) for direct performance comparisons with NAFION. The MEAs were prepared with a 2-inch square (5.1 cm×5.1 cm) unit of membrane placed between identically cut platinum coated (1 mg/cm²) carbon gas diffusion electrodes (Toray Paper, Electrochem Inc.). The gas diffusion electrodes were aligned with the catalyst sides in contact with the membrane. The two electrodes were then mechanically pressed together in a 5 ton press for 10 seconds (ambient temperature) combining the membrane and the two electrodes into an MEA.

The MEA was placed into a PEM fuel cell designed to accommodate the two-inch square flattened MEA. Pure hydrogen and air were used to generate cell power. Hydrogen was input at a constant 45 mL/min at 23° C. Oxygen passed over the cathode by diffusing through large gas channels. Cell temperature was held at approximately 25° C.

Figure 4:
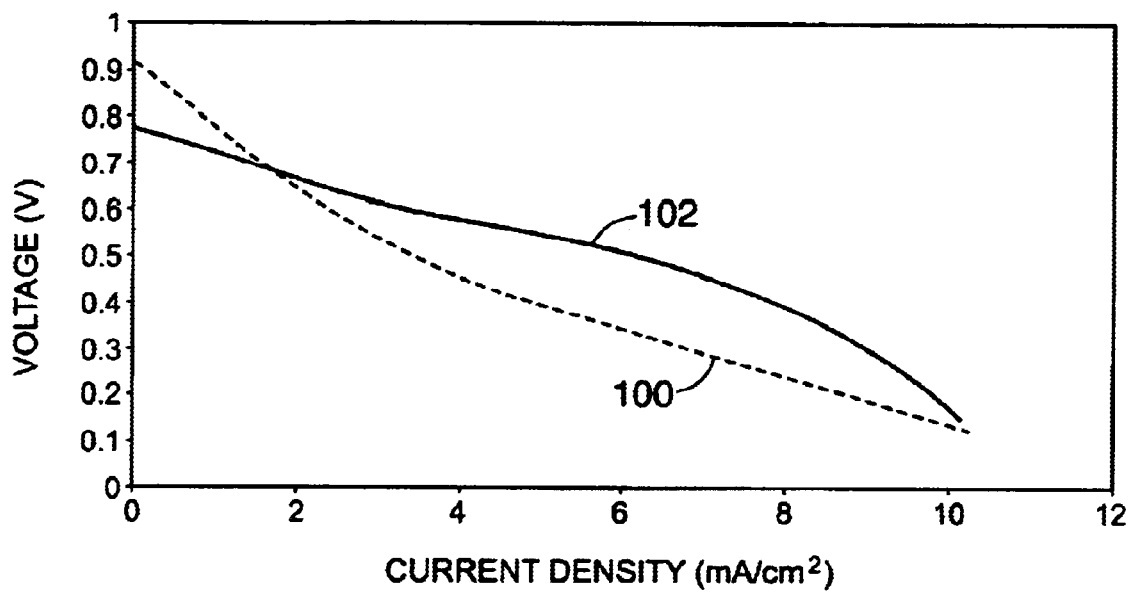
FIG. 4 are membrane performance curves that measure voltage vs. current density.

As a comparison, a commercial cell with NAFION was measured under the same parameters. The dimensions and design of the commercial cell were the same. Both outputs are displayed in the FIG. 4. As is apparent, the cell using the inventive composite electrolyte membrane (as represented by the broken line 100) performed quite well relative to the cell using NAFION (solid line 102) over the same current density range. The cell with the composite electrolyte membrane exhibited a potential that ranged from 13% above to 30% below that of the NAFION-based cell.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A composite electrolyte for use in electrochemical fuel cells that comprises:
   (i) an inorganic cation exchange material;
   (ii) a silica-based binder; and
   (iii) a polymer-based binder.

2. The composite electrolyte of claim 1 wherein the inorganic cation exchange material comprises about 10 wt % to about 99 wt %, the silica-based binder comprises about 0.5 wt % to about 40 wt %, and the polymer-based binder comprises about 1 wt % to 90 wt % of the composite electrolyte.

3. The composite electrolyte of claim 1 wherein the inorganic cation exchange material comprises about 75 wt % to about 85 wt %, the silica-based binder comprises about 2.5 wt % to about 7.5 wt %, and the polymer-based binder comprises about 15 wt % to 40 wt % of the composite electrolyte.

4. The composite electrolyte of claim 1 wherein the silica-based binder is selected from the group consisting of colloidal silica, tetraethylorthsilicate (TEOS) and mixtures thereof.

5. The composite electrolyte of claim 1 wherein the inorganic cation exchange material is selected from the group consisting of clays, zeolites, hydrous oxides, inorganic salts, and mixtures thereof.

6. The composite electrolyte of claim 1 wherein the inorganic cation exchange material is selected from the group consisting of montmorillonite, kaolinite, vermiculite, smectite, hectorite, mica, bentonite, nontronite, beidellite, volkonskoite, saponite, magadite, kenyaite, zeolite, alumina, rutile, and mixtures thereof.

7. The composite electrolyte of claim 1 wherein the polymer-based binder is selected from the group consisting of latex, thermoplastic, and mixtures thereof.

8. The composite electrolyte of claim 1 wherein the inorganic cation exchange material, the silica-based binder and the polymer-based binder comprises 97 wt % or more of solids content of the composite electrolyte.

9. The composite electrolyte of claim 1 wherein the composite electrolyte when measured in the substantially dried state consists essentially of the inorganic cation exchange material, the silica-based binder and the polymer-based binder.

10. The composite electrolyte of claim 1 wherein the composite electrolyte has a proton conductivity of about 0.05 S/cm or higher.

11. An electrochemical fuel cell comprising:
    (i) an anode;
    (ii) a cathode;
    (iii) fuel supply means for supplying fuel toward the anode;
    (iv) an oxidant supply means for supplying oxidant toward the cathode; and
    (v) a composite electrolyte that is positioned between the anode and cathode, wherein the composite electrolyte comprises (a) an inorganic cation exchange material, (b) a silica-based binder, and (c) a polymer-based binder.

12. The fuel cell of claim 11 wherein the inorganic cation exchange material comprises about 75 wt % to about 85 wt %, the silica-based binder comprises about 2.5 wt % to about 7.5 wt %, and the polymer-based binder comprises about 15 wt % to 40 wt % of the composite electrolyte.

13. The fuel cell of claim 11 wherein the inorganic cation exchange material comprises about 75 wt % to about 85 wt %, the silica-based binder comprises about 2.5 wt % to about 7.5 wt %, and the polymer-based binder comprises about 15 wt % to 40 wt % of the composite electrolyte.

14. The fuel cell of claim 11 wherein the inorganic cation exchange material is selected from the group consisting of clays, zeolites, hydrous oxides, inorganic salts and mixtures thereof.

15. The fuel cell of claim 11 wherein the inorganic cation exchange material is selected from the group consisting of montmorillonite, kaolinite, vermiculite, smectite, hectorite, mica, bentonite, nontronite, beidellite, volkonskoite, saponite, magadite, kenyaite, zeolite, alumina, rutile, and mixtures thereof.

16. The fuel cell of claim 11 wherein the silica-based binder is selected from the group consisting of colloidal silica, tetraethylorthsilicate (TEOS) and mixtures thereof.

17. The fuel cell of claim 11 wherein the polymer-based binder is selected from the group consisting of latex, thermoplastic, and mixtures thereof.

18. The fuel cell of claim 11 wherein the inorganic cation exchange material, the silicabased binder and the polymer-based binder comprises 97 wt % or more of solids content of the composite electrolyte.

19. The fuel cell of claim 11 wherein the composite electrolyte when measured in the substantially dried state consists essentially of the inorganic cation exchange material, the silica-based binder and the polymer-based binder.

20. The fuel cell of claim 11 wherein the composite electrolyte has a proton conductivity of about 0.05 S/cm or higher.

21. A method of fabricating a composite electrolyte for use in an electrochemical fuel cell that comprises the steps of:
    (i) applying a viscous liquid composition comprising of
       (a) an inorganic cation exchange material, (b) a silicabased binder, (c) a polymer-based binder, and (d) a solvent onto a surface of a substrate;

(ii) spreading the viscous liquid composition to form a uniform thickness layer on the substrate; and (iii) allowing the solvent to evaporate from the viscous liquid composition to yield the composite electrolyte.

22. The method of claim 21 wherein step (ii) comprises drawing the viscous liquid composition through a doctor blade assembly.

23. The method of claim 21 further comprising heating the viscous liquid composition in step (iii).

24. The method of claim 21 wherein the inorganic cation exchange material comprises about 10 wt % to about 99 wt %, the silica-based binder comprises about 0.5 wt % to about 40 wt %, and the polymer-based binder comprises about 1 wt % to 90 wt % of the composite electrolyte.

25. The method of claim 21 wherein the inorganic cation exchange material comprises about 75 wt % to about 85 wt %, the silica-based binder comprises about 2.5 wt % to about 7.5 wt %, and the polymer-based binder comprises about 15 wt % to 40 wt % of the composite electrolyte.

26. The method of claim 21 wherein the inorganic cation exchange material is selected from the group consisting of clays, zeolites, hydrous oxides, inorganic salts, and mixtures thereof.

27. The method of claim 21 wherein the cation exchange material is selected from the group consisting of montmorillonite, kaolinite, vermiculite, smectite, hectorite, mica, bentonite, nontronite, beidellite, volkonskoite, saponite, magadite, kenyaite, zeolite, alumina, rutile, and mixtures thereof.

28. The method of claim 21 wherein the silica-based binder is selected from the group consisting of colloidal silica, tetraethylorthsilicate (TEOS) and mixtures thereof.

29. The method of claim 21 wherein the polymer-based binder is selected from the group consisting of latex, thermoplastic, and mixtures thereof.

30. The method of claim 21 wherein the solvent comprises water.

31. The method of claim 21 wherein the inorganic cation exchange material, the silicabased binder and the polymer-based binder comprises 97 wt % or more of solids content of the composite electrolyte.

32. The method of claim 21 wherein the composite electrolyte when measured in the substantially dried state consists essentially of the inorganic cation exchange material, the silica-based binder and the polymer-based binder.

33. The method of claim 21 wherein the composite electrolyte has a proton conductivity of about 0.05 S/cm or higher.

* * * * *